United States Patent
Salehpour et al.

(10) Patent No.: US 11,113,389 B1
(45) Date of Patent: Sep. 7, 2021

(54) SYSTEMS AND METHODS FOR PROVIDING PERSISTENT VISUAL WARNINGS FOR APPLICATION LAUNCHERS

(71) Applicant: Symantec Corporation, Mountain View, CA (US)

(72) Inventors: Jonathon Salehpour, Culver City, CA (US); Somard Kruayatidee, Culver City, CA (US); Radoslav Stanev, Tehachapi, CA (US)

(73) Assignee: NortonLifeLock Inc., Tempe, AZ (US)

( * ) Notice: Subject to any disclaimer, the term of this patent is extended or adjusted under 35 U.S.C. 154(b) by 168 days.

(21) Appl. No.: 16/542,060

(22) Filed: Aug. 15, 2019

(51) Int. Cl.
*G06F 21/00* (2013.01)
*G06F 21/53* (2013.01)
*G06F 21/56* (2013.01)
*G06F 21/55* (2013.01)

(52) U.S. Cl.
CPC ............ *G06F 21/53* (2013.01); *G06F 21/554* (2013.01); *G06F 21/561* (2013.01); *G06F 21/562* (2013.01); *G06F 21/566* (2013.01)

(58) Field of Classification Search
CPC ...... G06F 21/53; G06F 21/554; G06F 21/561; G06F 21/562; G06F 21/566; G06F 21/50; G06F 21/51; G06F 21/52; G06F 21/56
See application file for complete search history.

(56) References Cited

U.S. PATENT DOCUMENTS

| | | | |
|---|---|---|---|
| 9,111,089 B1 | 8/2015 | Bhatia et al. | |
| 9,876,896 B1 | 1/2018 | Gailloux et al. | |
| 10,146,517 B2 | 12/2018 | Lim et al. | |
| 2006/0021029 A1 | 1/2006 | Brickell et al. | |
| 2011/0302655 A1* | 12/2011 | Tikkanen | G06F 21/562 726/24 |
| 2017/0053314 A1 | 2/2017 | Glover et al. | |
| 2017/0118233 A1* | 4/2017 | Abdulhayoglu | G06F 21/53 |

(Continued)

FOREIGN PATENT DOCUMENTS

| | | |
|---|---|---|
| GB | 2492857 A | 1/2013 |
| WO | 2013/015968 A1 | 1/2013 |
| WO | 2019/226228 A1 | 11/2019 |

OTHER PUBLICATIONS

Stanev et al., "Systems and Methods for Executing Application Launchers", U.S. Appl. No. 15/899,384, filed Feb. 20, 2018, 68 pages.

(Continued)

*Primary Examiner* — Edward Zee
(74) *Attorney, Agent, or Firm* — FisherBroyles, LLP

(57) ABSTRACT

The disclosed computer-implemented method for providing persistent visual warnings for application launchers may include (i) loading an application launcher into a sandbox, (ii) monitoring one or more functions of an application from the application launcher, (iii) querying a malware detection manager using information obtained from monitoring the functions of the application to determine whether the application is potentially harmful, and (iv) modifying, based on determining that the application is potentially harmful, an icon for the application launched from the sandbox to notify a user that the application is potentially harmful. Various other methods, systems, and computer-readable media are also disclosed.

20 Claims, 8 Drawing Sheets

(56) References Cited

U.S. PATENT DOCUMENTS

2018/0048660 A1* 2/2018 Paithane ............... G06F 21/554
2019/0362067 A1 11/2019 Salehpour et al.

OTHER PUBLICATIONS

Salehpour et al., "Systems and Methods for Controlling an Application Launch Based on a Security Policy", U.S. Appl. No. 15/985,734, filed May 22, 2018, 60 pages.
Sengottaian, Velmurugan, "Easy App Locker", URL: https://play.google.com/store/apps/details?id =app.vel.murugan.easyapplocker, 2014, 3 pages.
Non-Final Office Action received for U.S. Appl. No. 15/899,384 dated Dec. 2, 2019, 21 pages.
International Search Report and Written received for PCT Application Serial No. PCT/US2019/024115 dated Jun. 4, 2019, 11 pages.
Anonymous, "[APP] GO Launcher 1.1.3 released.", URL: http://forum.xda-developers.com/showthread.php?t=857269, Android Development and Hacking, Dec. 17, 2010, pp. 1-7.

* cited by examiner

SYSTEMS AND METHODS FOR PROVIDING PERSISTENT VISUAL WARNINGS FOR APPLICATION LAUNCHERS

BACKGROUND

Potentially harmful computer software applications are a constant threat to a variety of computing systems and devices. Examples of potentially harmful applications may include viruses, Trojans, spyware, and other kinds of malware. Different types of computer security systems combat these threats, but many potentially harmful applications still manage to infect computing systems and devices and may carry out a variety of malicious actions.

Security software vendors utilize various methods designed to detect potentially harmful applications, but in a closed ecosystem of applications, mechanisms for communicating information about the potentially harmful applications to the user are limited. The security software vendors may use notifications, such as a toast notification (e.g., message displayed in a box at the bottom of the screen that disappears after a few seconds), to inform the user of potential malware. However, such notifications may be easily missed or dismissed by users. Security software vendors may utilize custom shortcuts to notify a user of the potentially harmful application, but custom shortcuts may be not be supported by different application launchers of a computing device. The instant disclosure, therefore, identifies and addresses a need for systems and methods for providing persistent visual warnings for application launchers.

SUMMARY

As will be described in greater detail below, the instant disclosure describes various systems and methods for providing persistent visual warnings for application launchers.

In one example, a method for providing persistent visual warnings for application launchers may include (i) loading, by the computing device, an application launcher into a sandbox, (ii) monitoring one or more functions of an application from the application launcher, (iii) querying a malware detection manager using information obtained from monitoring the functions of the application to determine whether the application is potentially harmful, and (iv) modifying, based on determining that the application is potentially harmful, an icon for the application launched from the sandbox to notify a user that the application is potentially harmful.

In some examples, the method may include performing a security action to protect the computing device from the application that is potentially harmful. The security action may include preventing the application launcher from launching the application from the sandbox upon receiving an indication from the user to launch the application or displaying a notification to the user comprising instructions of how to remove the application.

In some examples, monitoring the one or more functions of the application from the application launcher may include monitoring a function call by the application launcher to at least one of an activity manager, a package manager, or a resource manager associated with the application. Querying the malware detection manager may include scanning the application to determine whether the application is potentially harmful. In some examples, querying the malware detection manager may include checking a blacklist to determine whether the application is potentially harmful.

In some examples, modifying the icon for the application launched from the sandbox may include at least one of switching the icon with a different icon, adding a color overlay to the icon, adding a badge to the icon, and changing text of the icon. In some examples, the method may include monitoring the one or more functions of a different application from the application launcher, determining, using information from monitoring the one or more functions of the different application, that an attribute of the different application has exceeded a threshold, and modifying, based on determining that the attribute of the different application has exceeded the threshold, a different icon for the different application launched from the sandbox to notify the user that the application has exceeded the threshold. In response to determining that the attribute of the different application no longer exceeds the threshold, the icon of the different application may be restored to an original state. In some examples, a user profile that includes the modified icon may be generated. The user profile may be transmitted to a server to distribute to a different computing device associated with the user profile.

In one embodiment, a system for providing persistent visual warnings for application launchers may include at least one physical processor and physical memory that includes computer-executable instructions that, when executed by the physical processor, cause the physical processor to (i) load an application launcher into a sandbox, (ii) monitor one or more functions of an application from the application launcher, (iii) query a malware detection manager using information obtained from monitoring the functions of the application to determine whether the application is potentially harmful, and (iv) modify, based on determining that the application is potentially harmful, an icon for the application launched from the sandbox to notify a user that the application is potentially harmful.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) load an application launcher into a sandbox, (ii) monitor one or more functions of an application from the application launcher, (iii) query a malware detection manager using information obtained from monitoring the functions of the application to determine whether the application is potentially harmful, and (iv) modify, based on determining that the application is potentially harmful, an icon for the application launched from the sandbox to notify a user that the application is potentially harmful.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
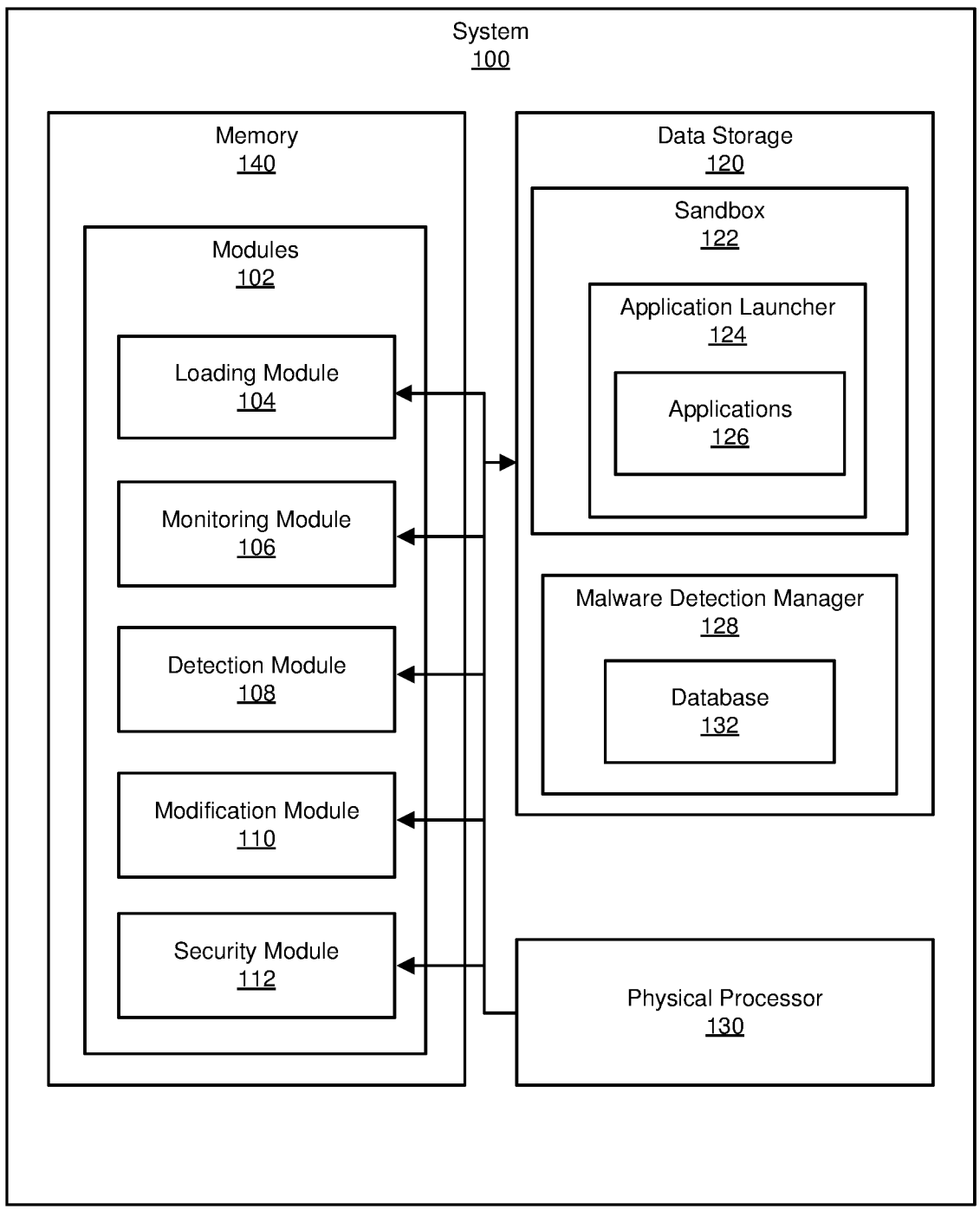
FIG. 1 is a block diagram of an example system for providing persistent visual warnings for application launchers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing persistent visual warnings for application launchers. As will be described in greater detail below, by sandboxing an application launcher on a computing device, the systems and methods described herein may determine whether an application is potentially harmful and may provide persistent visual warnings to a user that indicate that the application is potentially harmful before the application is launched. The warnings may be agnostic to the type of application launcher and thus able to provide uniform notifications across all application launchers.

Sandboxing application launchers enable the systems and methods described herein to monitor the functions of an application and detect whether the application is potentially harmful. In response to determining that the application is potentially harmful, the systems and methods described herein may modify or change the original icon of the application to provide a visual warning to the user indicating that the application may be associated with malware, grayware, and/or other harmful content. Examples of the modification to the original icon may include changing the icon to a different icon, overlaying the original icon with a distinct malware badge, modify the text associated with the icon, or the like. The persistent visual warning may be applied uniformly across all launchers by monitoring and augmenting the interactions of the sandboxed application launcher of the computing device.

Figure 2:
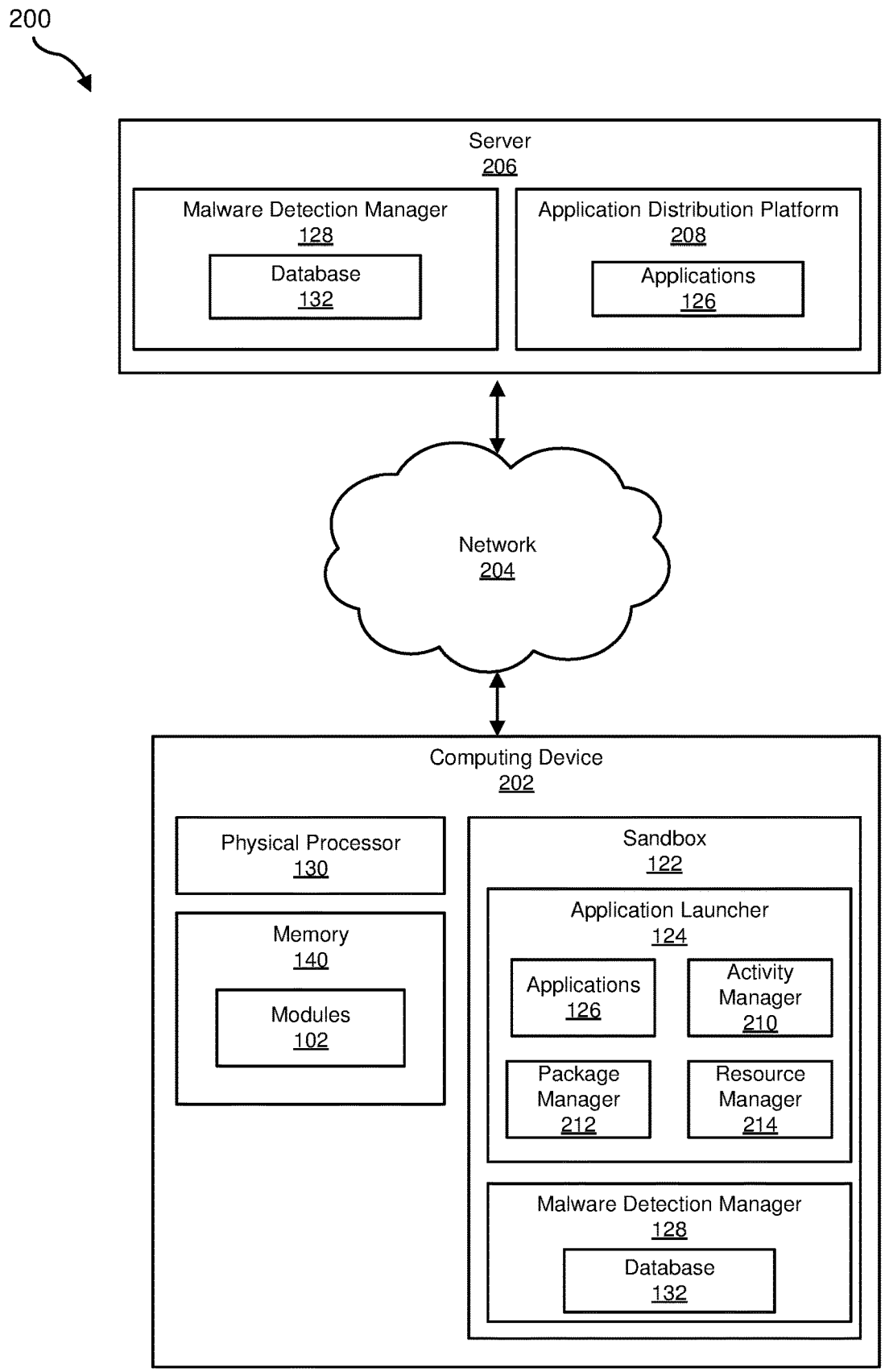
FIG. 2 is a block diagram of an additional example system for providing persistent visual warnings for application launchers.

The following will provide, with reference to FIGS. 1-2, detailed descriptions of example systems for providing persistent visual warnings for application launchers. Detailed descriptions of corresponding computer-implemented methods will also be provided in connection with FIG. 3. A detailed description of an example architecture for a secure application launcher will be provided in connection with FIG. 4. Example persistent visual warnings for application launchers will be provided in connection with FIG. 5. A detailed description of data flow through the example system for providing persistent visual warnings for application launchers will also be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of an example system 100 for providing persistent visual warnings for application launchers. As illustrated in this figure, the example system 100 may include one or more modules 102 for performing one or more tasks. As will be explained in greater detail below, the modules 102 may include a loading module 104, a monitoring module 106, a detection module 108, a modification module 110, and a security module 112. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202 and/or server 206). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as the physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate providing persistent visual warnings for application launchers. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include a data storage 120. The data storage 120 generally represents any type or form of storage system in the system 100. In one example, the data storage 120 may include storage space for the sandbox 122, the application launcher 124, the application 126, the malware detection manager 128, and the database 132.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with a server 206 via a network 204. In one example, all or a portion of the functionality of the modules 102 may be performed by the computing device 202, the server 206, and/or any other suitable computing system. As will be described in greater detail below, one or more of the modules 102 from FIG. 1 may, when executed by at least one processor of the computing device 202 and/or the server 206, enable the computing device 202 and/or the server 206 to provide persistent visual warnings for application launchers. For example, and as will be described in greater detail below, one or more of the modules 102 may cause the computing device 202 and/or the server 206 to provide persistent visual warnings for application launchers 124. For examples, and as will be described in greater detail below, one or more of the modules 102 may cause the computing device 202 to load, by the loading module 104, an application launcher 124 into a sandbox 122, (ii) monitor, by the monitoring module 106, one or more functions of an application 126 from the application launcher 124, (iii) query, by the detection module 108, a malware detection manager 128 using information obtained from monitoring the functions of the application 126 to determine whether the application 126 is potentially harmful, and (iv) modify, by the modification module 110, based on determining that the application 126 is potentially harmful, an icon for the application 126 launched from the sandbox 122 to notify a user that the application 126 is potentially harmful.

The computing device 202 generally represents any type or form of computing device capable of reading computer-executable instructions. In one example, the computing device 202 may be a mobile client computing device running a mobile security application. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device that is capable of reading computer-executable instructions. In one example, the server 206 may be an application server hosting an application distribution platform 208 for distributing applications 126 to computing devices, such as the computing device 202. The server 206 may also remotely host the malware detection manager 128 including database 132. The database 132 may include definitions and/or identification of malware. In some examples, the database 132 may be a blacklist of malware, grayware, or other potentially harmful malware. Additional examples of the server 206 include, without limitation, security servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

The application launcher 124 on the computing device 202 may also include an activity manager 210, a package manager 212, and/or a resource manager. The activity manager 210 generally represents any type or form of software manager that provides functions used to launch applications 126 from the application launcher 124. For example, a "startActivity" function (and variants thereof) may be utilized to initiate the launching (e.g., running) of an application 126 from application launcher 124.

The package manager 212 generally represents any type or form of software manager that provides functions for managing the packages installed on the computing device. The applications 126 may use the function calls "getInstalledApplications" or "getApplicationInfo" to retrieve the information for an application 126 (or all the installed applications 126 on the computing device 202). As part of this information, the package manager 212 may return resource identifiers for all of the resources associated with the application 126, which may include the resource identifiers for the icons of the application 126.

The resource manager 214 generally represents any type or form of software manager that provides functions used to query resources for a particular application. For example, given a resource identifier, such as one obtained from the package manager 212, the resource manager may the resource identifier to query resources for the application 126. The resource may be a theme, style, text, and/or icon associated with the application 126.

Figure 3:
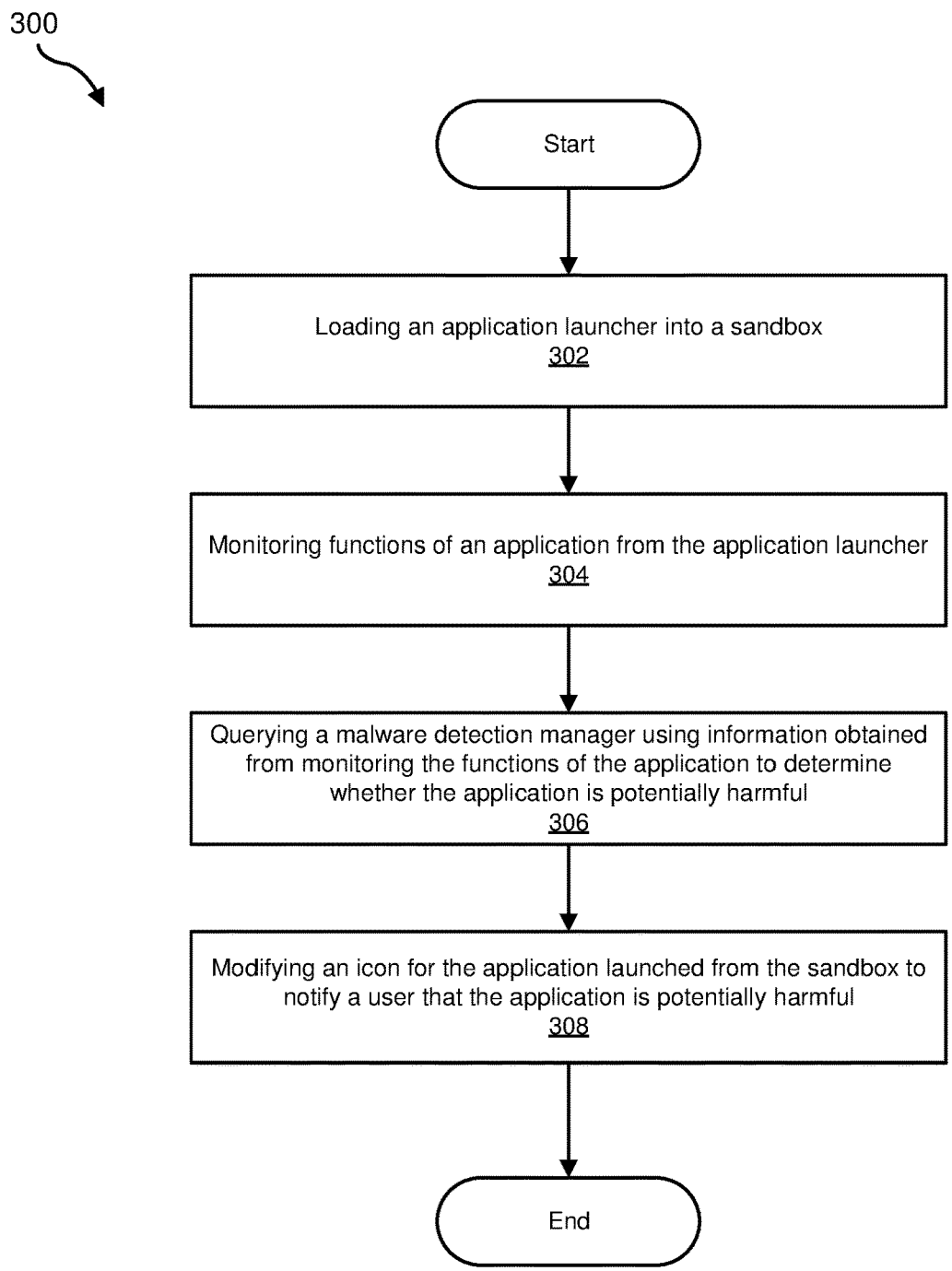
FIG. 3 is a flow diagram of an example method for providing persistent visual warnings for application launchers.

FIG. 3 is a flow diagram of an example computer-implemented method 300 for providing persistent visual warnings for application launchers. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may load an application launcher into a sandbox. The system may load the application launcher in any suitable manner. For example, the loading module 104 may, as part of the computing device 202 in FIG. 2, create the sandbox 122 and load the application launcher 124 into the sandbox 122. In some examples, the application launcher 124 may include a mobile device application launcher.

As used herein, the term "sandbox" generally refers to a limited area of storage space on a computer system that isolates applications and application data from critical system resources, other applications, and other application data. The sandbox may wrap, surround, encapsulate, monitor, and/or manage an underlying application, such as an application launcher. A sandbox may provide an extra layer of security that prevents harmful applications (e.g., malware) or harmful applications from negatively affecting the computer system. Sandboxed applications may only access resources in its limited storage space. If an application program needs to access resources or files outside of a sandbox, permission must be explicitly granted by the computer system.

As used herein, the term "application launcher" generally refers to executable program code on a computing device (e.g., a mobile computing device) that servers as the primary interaction point for a user and helps the user to locate and start other application programs. For example, an application launcher may provide shortcuts to application programs and store the shortcuts in a single location, making them easier to find. In some examples, an application launcher may be associated with a mobile device operating system, such as the ANDROID mobile operating system.

The loading module 104 may create a sandbox 122 within a computing environment of the computing device 202. In some examples, the sandbox 122 may be configured to obey a set of rules imposed by the operating system of the computing device 202. For example, the operating system may specify that, in order to register as an application launcher within the operating system environment, a corresponding application must be configured in a manner that satisfies one or more security policies, which may protect a user from unsafe behavior by application launchers.

In some examples, the sandbox 122 may restrict or omit some, or all, application launcher functionality beyond that provided by the application launcher. Application launcher functionality may generally refer to functionality that an application launcher 124 may perform as part of locating and/or executing underlying applications 126 for a user. The sandbox 122 may supplement the application launcher 124 with functionality that performs one or more security actions, as distinct from performing application launcher functionality, such as providing persistent visual warnings for potentially harmful applications, blocking, inhibiting, throttling, and/or delaying performance of a corresponding application launcher function, which may include installing, executing, and/or displaying an underlying application.

Figure 4:
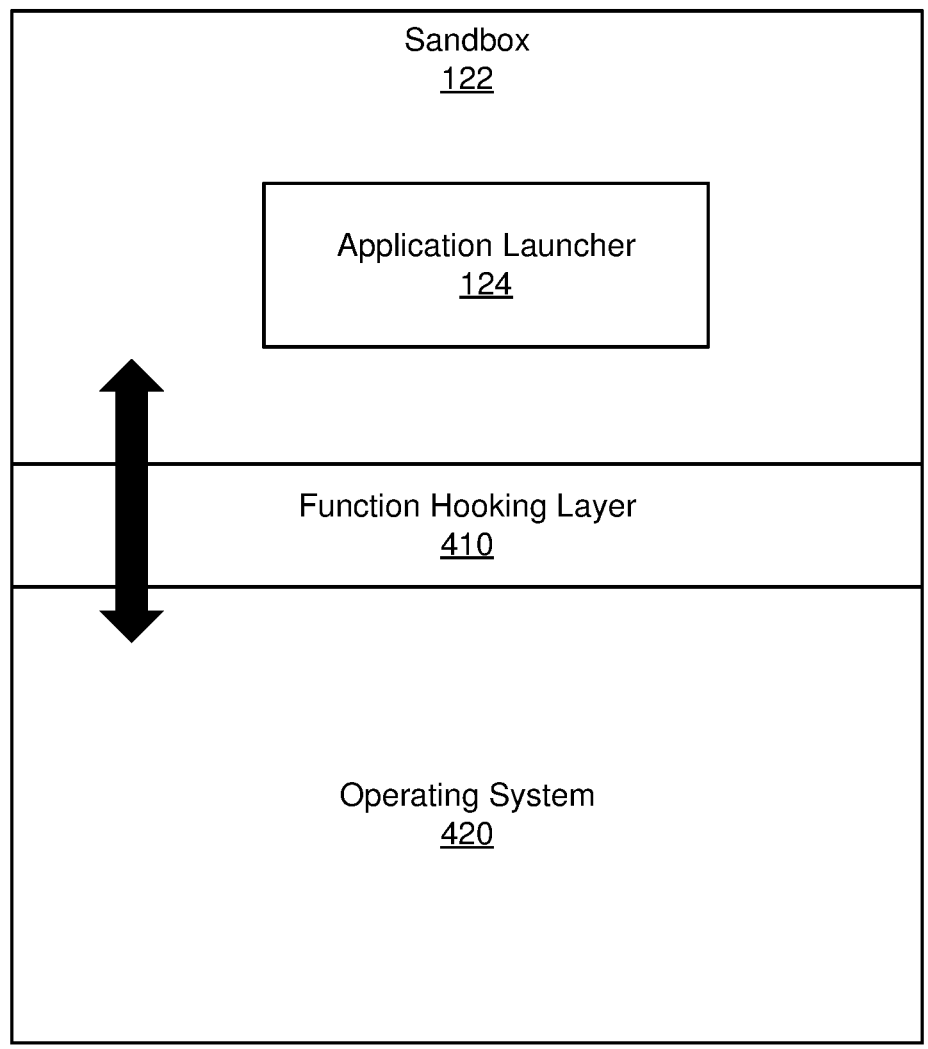
FIG. 4 is a block diagram of an example architecture for a secure application launcher.

In some examples, the sandbox 122 may include a set of programming hooks (depicted in FIG. 4 as the function hooking layer 410). The programming hooks may be located at a location of (i) a file access function for interacting with storage, (ii) a binder function for interacting with services, (iii) functions for executing installed packages, (iv) functions for enumerating installed packages, or the like. The sandbox 122 may include programming hooks that enable the sandbox 122 to monitor how the application launcher 124, which is executing within the sandbox 122, is attempting to access storage, request permissions, and/or communicate with components and/or services.

The sandbox 122 may inject one or more function hooks into its own process. The hooks may be placed at a location of some, or all, inter-process-communication (IPC) related functions, such as binders, sockets, etc. One or more of the hooks may also be placed at a location of input/output functions, such as file-system input/output functions. The injection of these hooks may provide the sandbox 122 with full control over interactions between the application launcher 124 and the operating system environment of the computing device 202.

In some examples, the loading module 104 may, as part of a mobile device security application running on the computing device 202, retrieve an existing application launcher (i.e., the application launcher 124) associated with the operating system of the computing device 202 and execute the application launcher 124 in the created sandbox 122.

At step 304, one or more of the systems described herein may monitor one or more functions of an application from the application launcher. This step may be performed in any suitable manner. For example, the monitoring module 106 may, as part of the computing device 202 in FIG. 2, monitor functions of the application 126 from the application launcher 124.

The monitoring module 106 may monitor the functions of the application 126 in a variety of ways. For example, the monitoring module 106 may monitor the activity manager 210, the package manager 212, and/or the resource manager 214 associated with application launcher 124 for the application 126. In some examples, the monitoring module 106 may be configured to inject software code (e.g., "hooks") into the application launcher 124 for the purpose of monitoring functions (e.g., an application launch initiation function) typically used for executing applications 126 from the application launcher 124. In some examples, a hook may include functionality provided by the monitoring module 106 to augment existing code in the application launcher 124 for the purpose of monitoring (e.g., intercepting) function calls made between the application launcher 124, the applications 126, and/or the operating system of the computing device 202.

At step 306, one or more of the systems described herein may query a malware detection manager using information obtained from monitoring the functions of the application to determine whether the application is potentially harmful. This step may be performed in any suitable manner. For example, the detection module 108 may, as part of the computing device 202 in FIG. 2, query the malware detection manager 128 to determine whether the application 126 is potentially harmful.

As used herein, the term "malware detection manager" generally refers computer-executable code configured to detect malware associated with applications. For example, a malware detection manager may scan applications for security threats or otherwise detect malware, grayware, and/or other harmful content or query a blacklist or database to determine whether an application is associated with malware.

The detection module 108 may query the malware detection manager 128 in a variety of ways. For example, the detection module 108 may request the malware detection manager 128 to scan the application 126 to determine whether the application 126 is potentially harmful. Additionally, or alternatively, the detection module 108 may query the malware detection manager 128 for a blacklist to determine whether the application 126 is listed and therefore potentially harmful. In some examples, the malware detection manager 128 may include a database 132 and/or blacklist of potentially harmful applications. The malware detection manager 128 may reside locally on the computing device 202 and may receive periodic updates to the blacklist and/or the database 132 from the server 206 and/or cloud computing environment through a pull or push mechanism. In some examples, the application 126 may be transmitted by the detection module 108 to the malware detection manager 128, which may reside on the server 206 or a cloud computing environment, to be classified as malware or benign.

Figure 5:
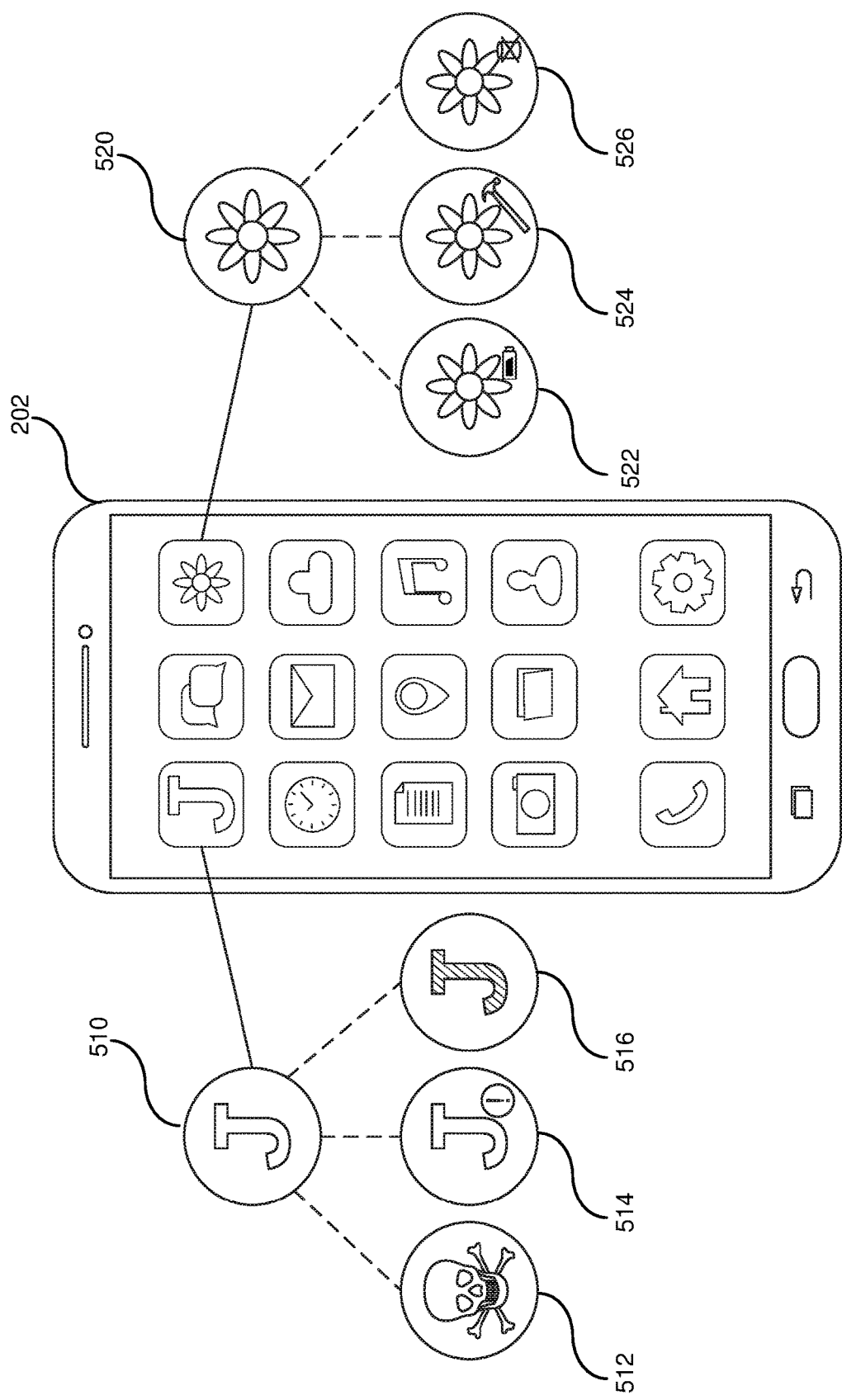
FIG. 5 is a diagram of example persistent visual warnings for application launchers.

At step 308, one or more of the systems described herein may perform a security action, such as modifying an icon for the application launched from the sandbox to notify a user that the application is potentially harmful. This step may be performed in any suitable manner. For example, the modification module 110 may, as part of the computing device 202 in FIG. 2, modify the icon for the application 126 launched from the sandbox 122 to notify a user of the computing device 202 that the application 126 is potentially harmful. In some examples, the modification module 110 may switch the icon of the application 126 with a different icon, as depicted in FIG. 5. The switched icon may indicate that the application is potentially harmful. In some examples, the modification module 110 may add a color overlay to the icon of the application 126. Different colors may indicate different levels of potential harm to the computing device 202. For example, a red overlay may indicate that the application 126 has been classified as malware, whereas a yellow overlay may indicate that the application 126 is potentially associated with malware. The modification module 110 may add a badge to the icon of the application 126 and/or change or modify the text of the icon to indicate that the application 126 is potentially harmful.

In some examples, the modification module 110 may, depending on the importance of the information that needs to be conveyed to the user, remove other badges or overlays provided by the application 126 and/or application launcher 124. If the detection module 108 determines that the application 126 is malware, the modification module 110 may remove other badges or overlays and only include the modifications indicating that the application 126 is malware. In some examples, the modification module 110 may modify the icon of the application 126 to indicate that the application is potentially harmful and may keep any badges or overlays provided by the application launcher 124 and/or the application 126, which may be used for other purposes (e.g., update pending, notifications associated with the application 126, etc.).

In some examples, one or more of the systems described herein may perform, based on determining that the application is potentially harmful, an additional security action to protect the computing device from the application that is potentially harmful. For example, the security module 112 may, as part of the computing device 202 in FIG. 2, perform a security action prevent the application launcher 124 from launching the application 126 that has been determined to be potentially harmful, from sandbox 122.

The security module 112 may perform a security action in a variety of ways. For example, the security module 112 may, in response to receiving an indication from the user to launch the application, block the application 126 from being executed from the application launcher 124 after having determined, at a run-time for the application 126, that the application 126 is potentially harmful.

In some examples, a closed ecosystem of the computing device 202 may prevent the security module 112 from automatically blocking the potentially harmful application from launched by the application launcher. In some examples, the security module 112, in response to receiving an indication from the user to execute the application 126, may display a notification to the user that includes instructions of how to remove the application 126 from the computing device 202.

In addition to providing persistent visual warnings for potential malware, the systems and methods described herein may provide visual warnings for different attributes of the applications 126 of the computing device 202. For example, the detection module 108 may use information collected by the monitoring module 106 to monitor different attributes of the applications 126. Examples of attributes that may be monitored may include, but are not limited to, memory usage, privacy risks (e.g., permission requested by the application 126 to offload sensitive information), categorization as a potentially unwanted application, battery consumption, network traffic, types and number of advertisements displayed by the application 126, mature content, storage, number of crashed by the application in a window of time, and the like. The detection module 108 may determine, using the information from the monitoring module 106 obtained from monitoring the functions of the application 126, that an attribute has exceeded a threshold.

The modification module 110 may, in response to the determination that the attribute of the application 126 has exceeded the threshold, modify the icon of the application 126 launched from the sandbox 122 to notify the user that the application has exceeded the threshold. For example, if the application 126 has crashed more time than a designated threshold within an identified window of time, the modification module 110 may modify the icon of the application 126 to overlay a badge with a construction sign, indicating that the application 126 may crash frequently. In some examples, if the application 126 has a history of high network traffic, the modification module 110 may modify the icon of the application 126 to overlay a badge to indicate high network traffic.

In some examples, the modification module 110 may generate a user profile and may store the modified icons (e.g., indicating potential malware and/or exceeded attribute thresholds) in the user profile. The user profile may be transmitted to a server, such as the server 206, and may be distributed to different computing devices associated with the user profile. This may provide the user with a consistent user experience across multiple devices.

FIG. 4 is a block diagram of an example architecture 400 for a secure application launcher. Application virtualization enables encapsulation of an application from the operating system on which it is executed to restrict and/or control the behavior of the application. Application virtualization may be used for security purposes, such as preventing access to sensitive data, as well as running multiple instances of the same application with different accounts. In some examples, the virtualization of an application may be used to ensure that the presence of the virtualized application is not leaked out to the system and preventing applications from masquerading as different applications. The sandbox 122 may intercept system calls to prevent the leak of an identifier of a target application by swapping package names, user identifiers, and the like.

As depicted in FIG. 4, the function hooking layer 410 may be interposed between the sandbox 122, which may be referred to as a host application, and the operating system 420. The sandbox 122 may inject several function hooks into its own process through the function hooking layer 410. The hooks may be placed in all inter-process-communication related functions (e.g., binders, sockets, etc.) as well as IO-related functions (e.g., file-system), which enables the sandbox 122 to have full control over any information or interactions of the virtualized application, such as the application launcher 124, that are externally visible to the system.

The virtualized application, such as the application launcher 124, may be loaded into process space of the sandbox 122. In some examples, the virtualized application may be loaded into the process space by using class loaders directly or using internal application programming interfaces (APIs). Through the function hooking layer 410, the sandbox 122 may monitor all functions of the application launcher 124 to communicate with, for example, the operating system 420 of the computing device 202 and/or an external component or service. The information obtained from monitoring the functions to determine whether the application is harmful. In response to determining that the application is harmful, the hooking layer 410 may be used to intercept an icon retrieval by the application 126 and switch the original icon with the modified icon which may serve as a visual warning to the user that the application 126 is potentially harmful. In some examples, the sandbox 122 may prevent the virtualized application 126 from making certain function calls by blocking the function call from occurring (e.g., intercepting the function calls and preventing them from completion).

FIG. 5 is a diagram of example persistent visual warnings for application launchers. The home screen of the computing device 202 may display different icons associated with different applications 126. For example, a user may download an application 126 which may be associated with an icon 510. The systems and methods described herein may determine that the application 126 is potentially harmful. In some examples, the application launcher 124 may not be able to display a persistent visual warning to the user indicating that the application 126 is potentially harmful. The modification module 110 may modify the icon 510 of the application 126 to provide a visual warning to the user that the application 126 is potentially harmful. In some examples, the modification module 110 may change the icon 510 by substituting a different icon, such as the icon 512. In some example, the modification module 110 may create a modified icon 514 by adding an icon badge to the original icon 510. In some examples, the modification module 110 may create a modified icon 516 by adding an overlay, such as a color overlay, to the original icon 510, to indicate that the application 126 is potentially harmful.

In some examples, the systems and methods described herein may provide persistent visual warnings for application launchers for different purposes. For example, the systems and methods described herein may determine when applications have exceeded designated thresholds for different attributes of applications, such as storage usage, network consumption, frequency of crashes, and the like. In some examples, the modification module 110, in response to determining that a threshold has been exceeded, may modify the icon 520 of the application 126 to indicate that an attribute of the application has exceeded the threshold. For example, the modification module 110 may modify the icon 520 to generate a modified icon 522 that adds an overlay to the original icon 520 that indicates that the application 126 has high battery consumption. In some examples, if the application has crashed a number of times that exceeds a threshold, the modification module 110 may generate a modified icon 524 that adds an overlay badge to the original icon 520 indicating that the application is prone to crashes. In another example, the modification module 110 may generate a modified icon 526 that adds an overlay badge to the original icon 520 indicating that the application requires a lot of storage.

Figure 6:
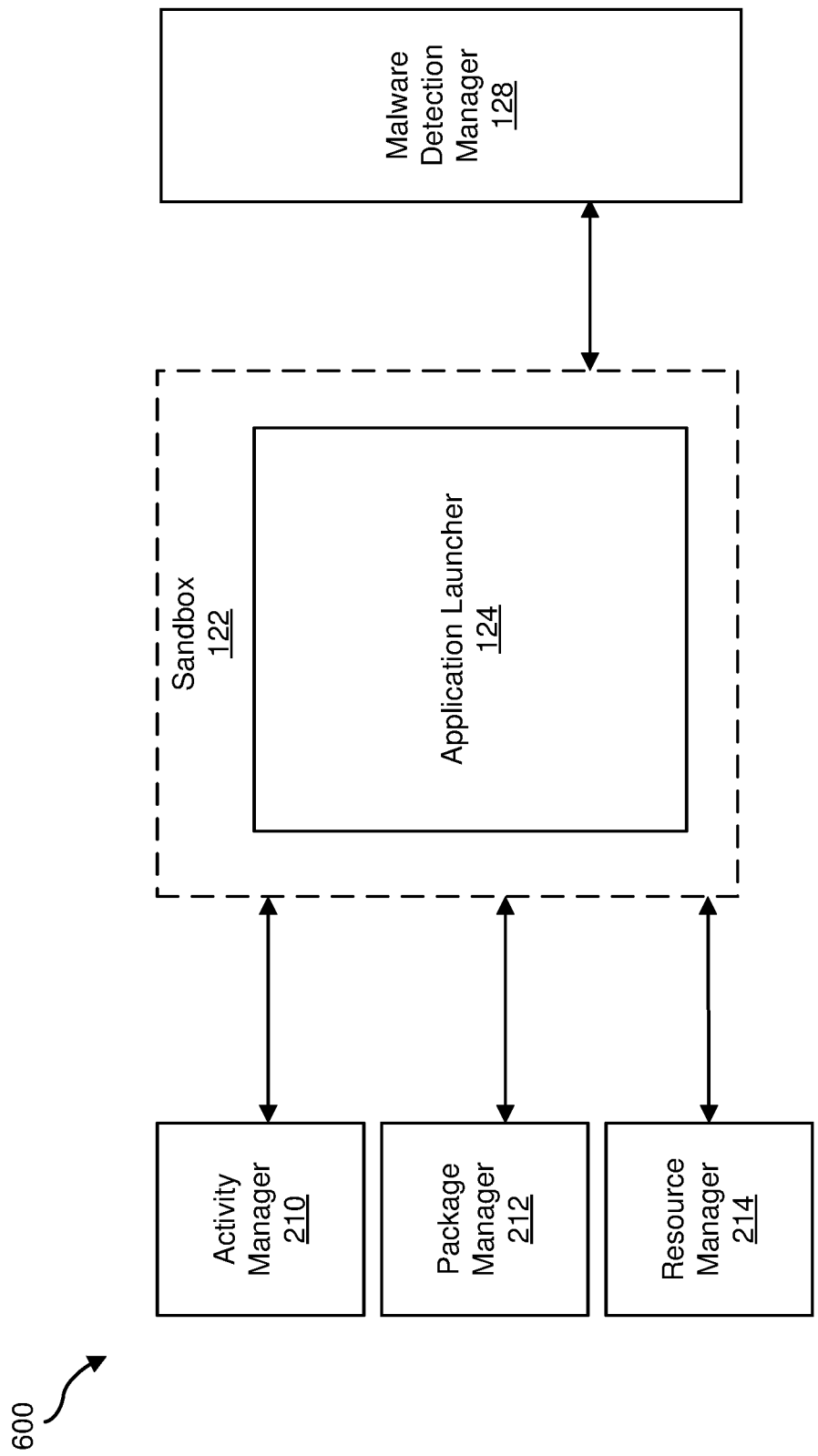
FIG. 6 is a block diagram of an example data flow for providing persistent visual warnings for application launchers.

FIG. 6 is a block diagram of an example data flow 600 for providing persistent visual warnings for application launchers. In the system 600 of FIG. 6, the application launcher 124 may be loaded in the sandbox 122. The sandbox 122 may monitor the functions of an application from the application launcher 124 to, for example, the activity manager 210, the package manager 212, and/or the resource manager 214. The detection module 108 may be configured to query a malware detection manager 128 using information obtained from monitoring the functions to determine if the application 126 may be launched. Upon receiving the query, malware detection manager 128 may determine that the application is harmful or potentially harmful (e.g., contains malware or the malicious content). The modification module 110 may modify the icon of potentially harmful application 126 to provide the user with a persistent visual warning.

The systems and methods described herein may sandbox an application launcher to provide persistent visual warnings identifying potentially dangerous applications on a computing system (e.g., a mobile device). Once the application launcher is loaded into the sandbox, all aspects of the application launcher may be monitored. For example, the systems and methods described herein may monitor the files the application launcher is accessing, permissions it is requesting, and/or services it is utilizing. Using information obtained from monitoring an application of the application launcher, a malware detection manager may be queried to determine whether the application is potentially harmful. In response to determining the application is potentially harmful, the systems and methods described herein may modify the icon of the potentially harmful application and provide the modified icon to the application launcher to present to the user as a persistent visual warning of the potentially harmful application.

Figure 7:
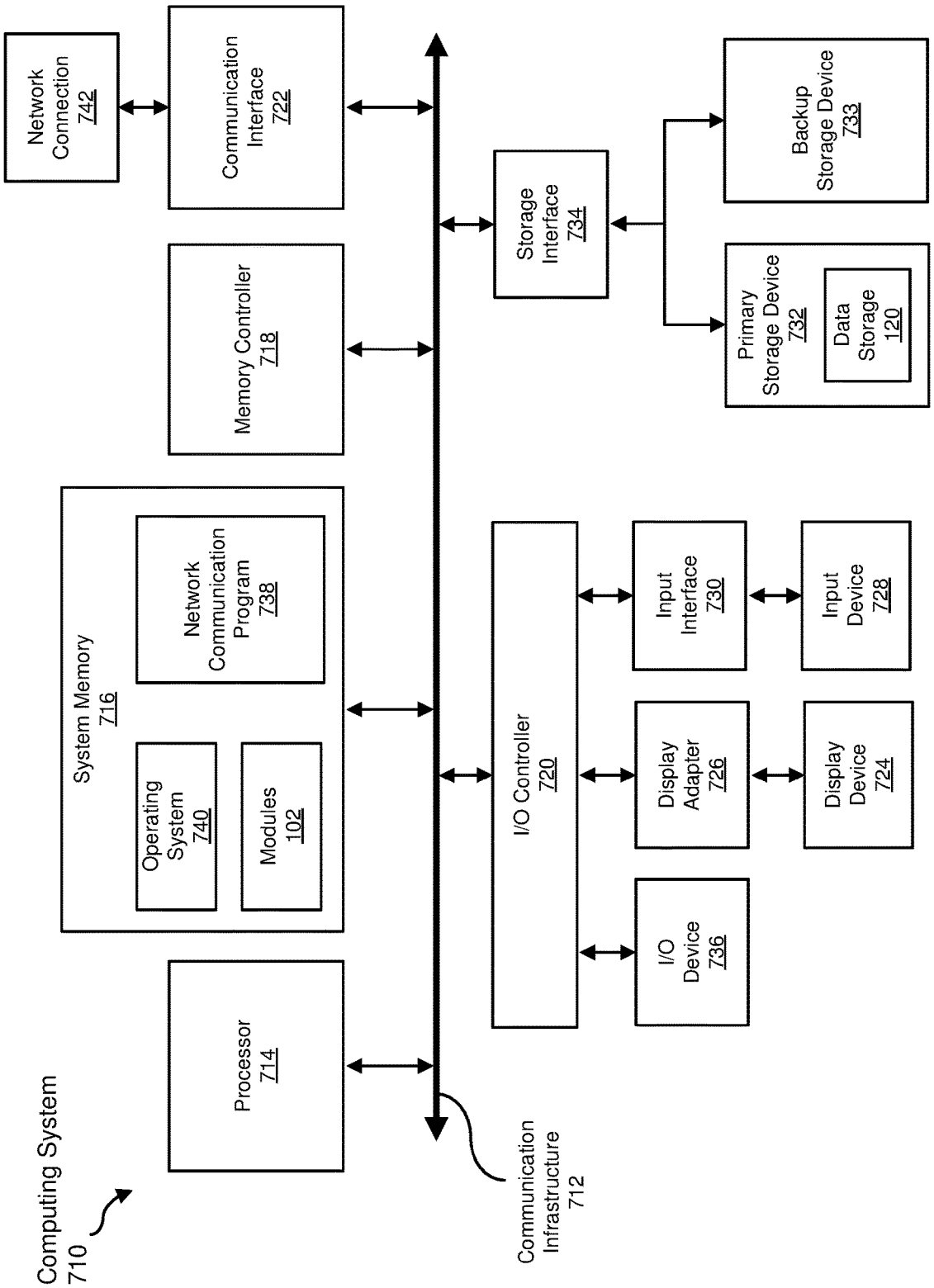
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of the computing system 710 may perform and/or be a means for performing, either alone or in combination with other elements, one or more of the steps described herein (such as one or more of the steps illustrated in FIG. 3). All or a portion of the computing system 710 may also perform and/or be a means for performing any other steps, methods, or processes described and/or illustrated herein.

The computing system 710 broadly represents any single or multi-processor computing device or system capable of executing computer-readable instructions. Examples of the computing system 710 include, without limitation, workstations, laptops, client-side terminals, servers, distributed computing systems, handheld devices, or any other computing system or device. In its most basic configuration, the computing system 710 may include at least one processor 714 and a system memory 716.

The processor 714 generally represents any type or form of physical processing unit (e.g., a hardware-implemented central processing unit) capable of processing data or interpreting and executing instructions. In certain embodiments, the processor 714 may receive instructions from a software application or module. These instructions may cause the processor 714 to perform the functions of one or more of the example embodiments described and/or illustrated herein.

The system memory 716 generally represents any type or form of volatile or non-volatile storage device or medium capable of storing data and/or other computer-readable instructions. Examples of the system memory 716 include, without limitation, Random Access Memory (RAM), Read Only Memory (ROM), flash memory, or any other suitable memory device. Although not required, in certain embodiments the computing system 710 may include both a volatile memory unit (such as, for example, the system memory 716) and a non-volatile storage device (such as, for example, the primary storage device 732, as described in detail below). In one example, one or more of the modules 102 from FIG. 1 may be loaded into the system memory 716.

In some examples, the system memory 716 may store and/or load an operating system 740 for execution by the processor 714. In one example, the operating system 740 may include and/or represent software that manages computer hardware and software resources and/or provides common services to computer programs and/or applications on the computing system 710. Examples of the operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 710 may also include one or more components or elements in addition to the processor 714 and the system memory 716. For example, as illustrated in FIG. 7, the computing system 710 may include a memory controller 718, an Input/Output (I/O) controller 720, and a communication interface 722, each of which may be interconnected via a communication infrastructure 712. The communication infrastructure 712 generally represents any type or form of infrastructure capable of facilitating communication between one or more components of a computing device. Examples of the communication infrastructure 712 include, without limitation, a communication bus (such as an Industry Standard Architecture (ISA), Peripheral Component Interconnect (PCI), PCI Express (PCIe), or similar bus) and a network.

The memory controller 718 generally represents any type or form of device capable of handling memory or data or controlling communication between one or more components of the computing system 710. For example, in certain embodiments, the memory controller 718 may control communication between the processor 714, the system memory 716, and the I/O controller 720 via the communication infrastructure 712.

The I/O controller 720 generally represents any type or form of module capable of coordinating and/or controlling the input and output functions of a computing device. For example, in certain embodiments, the I/O controller 720 may control or facilitate transfer of data between one or more elements of the computing system 710, such as the processor 714, the system memory 716, the communication interface 722, the display adapter 726, the input interface 730, and the storage interface 734.

As illustrated in FIG. 7, the computing system 710 may also include at least one display device 724 coupled to the I/O controller 720 via a display adapter 726. The display device 724 generally represents any type or form of device capable of visually displaying information forwarded by the display adapter 726. Similarly, the display adapter 726 generally represents any type or form of device configured to forward graphics, text, and other data from the communication infrastructure 712 (or from a frame buffer, as known in the art) for display on the display device 724.

As illustrated in FIG. 7, the example computing system 710 may also include at least one input device 728 coupled to the I/O controller 720 via an input interface 730. The input device 728 generally represents any type or form of input device capable of providing input, either computer or human generated, to the example computing system 710. Examples of the input device 728 include, without limitation, a keyboard, a pointing device, a speech recognition device, variations or combinations of one or more of the same, and/or any other input device.

Additionally, or alternatively, the example computing system 710 may include additional I/O devices. For example, the example computing system 710 may include the I/O device 736. In this example, the I/O device 736 may include and/or represent a user interface that facilitates human interaction with the computing system 710. Examples of the I/O device 736 include, without limitation, a computer mouse, a keyboard, a monitor, a printer, a modem, a camera, a scanner, a microphone, a touchscreen device, variations or combinations of one or more of the same, and/or any other I/O device.

The communication interface 722 broadly represents any type or form of communication device or adapter capable of facilitating communication between the example computing system 710 and one or more additional devices. For example, in certain embodiments, the communication interface 722 may facilitate communication between the computing system 710 and a private or public network including additional computing systems. Examples of the communication interface 722 include, without limitation, a wired network interface (such as a network interface card), a wireless network interface (such as a wireless network interface card), a modem, and any other suitable interface. In at least one embodiment, the communication interface 722 may provide a direct connection to a remote server via a direct link to a network, such as the Internet. The communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 722 may also represent a host adapter configured to facilitate communication between the computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 722 may also allow the computing system 710 to engage in distributed or remote computing. For example, the communication interface 722 may receive instructions from a remote device or send instructions to a remote device for execution.

In some examples, the system memory 716 may store and/or load a network communication program 738 for execution by the processor 714. In one example, the network communication program 738 may include and/or represent software that enables the computing system 710 to establish a network connection 742 with another computing system (not illustrated in FIG. 7) and/or communicate with the other computing system by way of the communication interface 722. In this example, the network communication program 738 may direct the flow of outgoing traffic that is sent to the other computing system via the network connection 742. Additionally, or alternatively, the network communication program 738 may direct the processing of incoming traffic that is received from the other computing system via the network connection 742 in connection with the processor 714.

Although not illustrated in this way in FIG. 7, the network communication program 738 may alternatively be stored and/or loaded in the communication interface 722. For example, the network communication program 738 may include and/or represent at least a portion of software and/or firmware that is executed by a processor and/or Application Specific Integrated Circuit (ASIC) incorporated in the communication interface 722.

As illustrated in FIG. 7, the example computing system 710 may also include a primary storage device 732 and a backup storage device 733 coupled to the communication infrastructure 712 via a storage interface 734. The storage devices 732 and 733 generally represent any type or form of storage device or medium capable of storing data and/or other computer-readable instructions. For example, the storage devices 732 and 733 may be a magnetic disk drive (e.g., a so-called hard drive), a solid state drive, a floppy disk drive, a magnetic tape drive, an optical disk drive, a flash drive, or the like. The storage interface 734 generally represents any type or form of interface or device for transferring data between the storage devices 732 and 733 and other components of the computing system 710. In one example, the data storage 120 from FIG. 1 may be stored and/or loaded in the primary storage device 732.

In certain embodiments, the storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 732 and 733 may also include other similar structures or devices for allowing computer software, data, or other computer-readable instructions to be loaded into the computing system 710. For example, the storage devices 732 and 733 may be configured to read and write software, data, or other computer-readable information. The storage devices 732 and 733 may also be a part of the computing system 710 or may be a separate device accessed through other interface systems.

Many other devices or subsystems may be connected to the computing system 710. Conversely, all of the components and devices illustrated in FIG. 7 need not be present to practice the embodiments described and/or illustrated herein. The devices and subsystems referenced above may also be interconnected in different ways from that shown in FIG. 7. The computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 710. All or a portion of the computer program stored on the computer-readable medium may then be stored in the system memory 716 and/or various portions of the storage devices 732 and 733. When executed by the processor 714, a computer program loaded into the computing system 710 may cause the processor 714 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 710 may be configured as an Application Specific Integrated Circuit (ASIC) adapted to implement one or more of the example embodiments disclosed herein.

Figure 8:
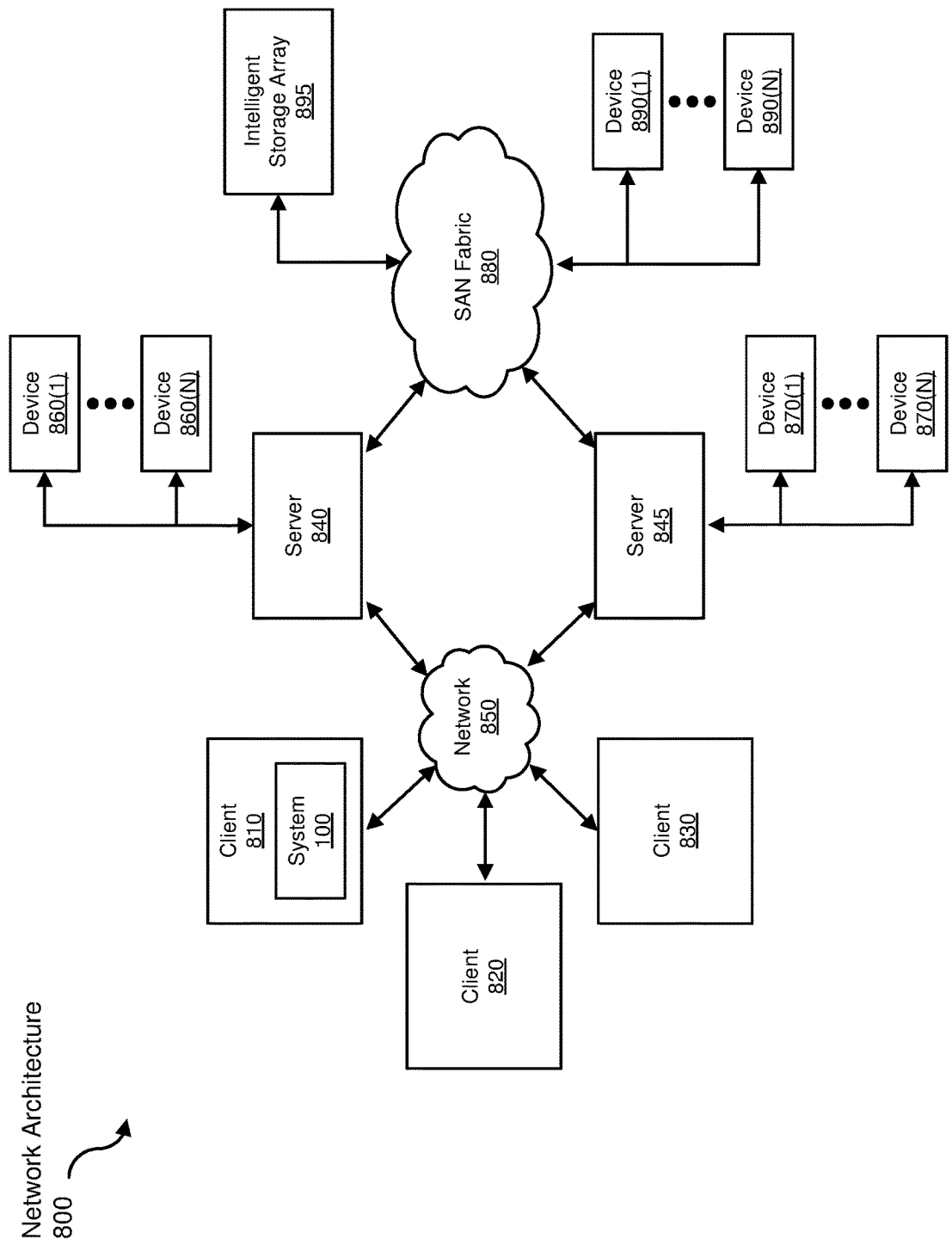
FIG. 8 is a block diagram of an example computing network capable of implementing one or more of the embodiments described and/or illustrated herein.

FIG. 8 is a block diagram of an example network architecture 800 in which the client systems 810, 820, and 830 and the servers 840 and 845 may be coupled to a network 850. As detailed above, all or a portion of the network architecture 800 may perform and/or be a means for performing, either alone or in combination with other elements, one or more of the steps disclosed herein (such as one or more of the steps illustrated in FIG. 3). All or a portion of the network architecture 800 may also be used to perform and/or be a means for performing other steps and features set forth in the instant disclosure.

The client systems 810, 820, and 830 generally represent any type or form of computing device or system, such as example the computing system 710 in FIG. 7. Similarly, the servers 840 and 845 generally represent computing devices or systems, such as application servers or database servers, configured to provide various database services and/or run certain software applications. The network 850 generally represents any telecommunication or computer network including, for example, an intranet, a WAN, a LAN, a PAN, or the Internet. In one example, the client systems 810, 820, and/or 830 and/or the servers 840 and/or 845 may include all or a portion of the system 100 from FIG. 1.

As illustrated in FIG. 8, one or more storage devices 860(1)-(N) may be directly attached to the server 840. Similarly, one or more storage devices 870(1)-(N) may be directly attached to the server 845. The storage devices 860(1)-(N) and the storage devices 870(1)-(N) generally represent any type or form of storage device or medium capable of storing data and/or other computer-readable instructions. In certain embodiments, the storage devices 860(1)-(N) and the storage devices 870(1)-(N) may represent Network-Attached Storage (NAS) devices configured to communicate with the servers 840 and 845 using various protocols, such as Network File System (NFS), Server Message Block (SMB), or Common Internet File System (CIFS).

The servers 840 and 845 may also be connected to a Storage Area Network (SAN) fabric 880. The SAN fabric 880 generally represents any type or form of computer network or architecture capable of facilitating communication between a plurality of storage devices. The SAN fabric 880 may facilitate communication between the servers 840 and 845 and a plurality of storage devices 890(1)-(N) and/or an intelligent storage array 895. The SAN fabric 880 may also facilitate, via the network 850 and the servers 840 and 845, communication between the client systems 810, 820, and 830 and the storage devices 890(1)-(N) and/or the intelligent storage array 895 in such a manner that the devices 890(1)-(N) and the array 895 appear as locally attached devices to the client systems 810, 820, and 830. As with the storage devices 860(1)-(N) and the storage devices 870(1)-(N), the storage devices 890(1)-(N) and the intelligent storage array 895 generally represent any type or form of storage device or medium capable of storing data and/or other computer-readable instructions.

In certain embodiments, and with reference to the example computing system 710 of FIG. 7, a communication interface, such as the communication interface 722 in FIG. 7, may be used to provide connectivity between each client system 810, 820, and 830 and the network 850. The client systems 810, 820, and 830 may be able to access information on the server 840 or 845 using, for example, a web browser or other client software. Such software may allow the client systems 810, 820, and 830 to access data hosted by the server 840, the server 845, the storage devices 860(1)-(N), the storage devices 870(1)-(N), the storage devices 890(1)-(N), or the intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 840, the server 845, the storage devices 860(1)-(N), the storage devices 870(1)-(N), the storage devices 890(1)-(N), the intelligent storage array 895, or any combination thereof. All or a portion of one or more of the example embodiments disclosed herein may also be encoded as a computer program, stored in the server 840, run by the server 845, and distributed to the client systems 810, 820, and 830 over the network 850.

As detailed above, the computing system 710 and/or one or more components of the network architecture 800 may perform and/or be a means for performing, either alone or in combination with other elements, one or more steps of an example method for providing persistent visual warnings for application launchers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing persistent visual warnings for an application launcher, at least a portion of the method being performed by a computing device comprising at least one processor, the method comprising:
   loading, by the computing device, the application launcher into a sandbox;
   monitoring one or more functions of an application launched from the sandbox from the application launcher;
   querying a malware detection manager using information obtained from monitoring the one or more functions of the application to determine whether the application is potentially harmful;
   modifying, based on determining that the application is potentially harmful, an icon for the application to notify a user that the application is potentially harmful;
   monitoring one or more functions of a different application launched from the sandbox from the application launcher;
   determining, using information obtained from monitoring the one or more functions of the different application, that an attribute of the different application has exceeded a threshold;
   modifying, based on determining that the attribute of the different application has exceeded the threshold, an icon for the different application to notify the user that the different application has exceeded the threshold; and
   in response to determining that the attribute of the different application no longer exceeds the threshold, restoring the icon of the different application to an original state.

2. The computer-implemented method of claim 1, further comprising:
   performing a security action to protect the computing device from the application that is potentially harmful.

3. The computer-implemented method of claim 2, wherein the security action comprises at least one of:
   preventing the application launcher from launching the application from the sandbox upon receiving an indication from the user to launch the application; or
   displaying a notification to the user comprising instructions of how to remove the application.

4. The computer-implemented method of claim 1, wherein monitoring the one or more functions of the application or of the different application from the application launcher comprises monitoring a function call by the application launcher to at least one of an activity manager, a package manager, or a resource manager associated with the application or with the different application.

5. The computer-implemented method of claim 1, wherein querying the malware detection manager comprises scanning the application to determine whether the application is potentially harmful.

6. The computer-implemented method of claim 1, wherein querying the malware detection manager comprises checking a blacklist to determine whether the application is potentially harmful.

7. The computer-implemented method of claim 1, wherein modifying the icon for the application or for the different application launched from the sandbox comprises at least one of:

switching the icon with a different icon;
adding a color overlay to the icon;
adding a badge to the icon; and
changing text of the icon.

8. The computer-implemented method of claim 1, further comprising:
generating a user profile comprising the modified icon; and
transmitting the user profile to a server to distribute to a different computing device associated with the user profile.

9. A system for providing persistent visual warnings for an application launcher, the system comprising:
at least one physical processor;
physical memory comprising computer-executable instructions that, when executed by the physical processor, cause the physical processor to:
load the application launcher into a sandbox;
monitor one or more functions of an application launched from the sandbox from the application launcher;
query a malware detection manager using information obtained from monitoring the one or more functions of the application to determine whether the application is potentially harmful;
modify, based on determining that the application is potentially harmful, an icon for the application to notify a user that the application is potentially harmful;
monitor one or more functions of a different application launched from the sandbox from the application launcher;
determine, using information obtained from monitoring the one or more functions of the different application, that an attribute of the different application has exceeded a threshold;
modify, based on determining that the attribute of the different application has exceeded the threshold, an icon for the different application to notify the user that the different application has exceeded the threshold; and
in response to determining that the attribute of the different application no longer exceeds the threshold, restore the icon of the different application to an original state.

10. The system of claim 9, wherein the computer-executable instructions further cause the physical processor to:
perform a security action to protect a computing device from the application that is potentially harmful.

11. The system of claim 10, wherein the security action comprises at least one of:
preventing the application launcher from launching the application from the sandbox upon receiving an indication from the user to launch the application; or
displaying a notification to the user comprising instructions of how to remove the application.

12. The system of claim 9, wherein, to monitor the one or more functions of the application or of the different application from the application launcher, the computer-executable instructions further cause the physical processor to monitor a function call by the application launcher to at least one of an activity manager, a package manager, or a resource manager associated with the application or with the different application.

13. The system of claim 9, wherein, to query the malware detection manager, the computer-executable instructions further cause the physical processor to:

scan the application to determine whether the application is potentially harmful.

14. The system of claim 9, wherein, to query the malware detection manager, the computer-executable instructions further cause the physical processor to:
check a blacklist to determine whether the application is potentially harmful.

15. The system of claim 9, wherein, to modify the icon for the application or for the different application launched from the sandbox, the computer-executable instructions further cause the physical processor to at least one of:
switch the icon with a different icon;
add a color overlay to the icon;
add a badge to the icon; and
change text of the icon.

16. A non-transitory computer-readable medium comprising one or more computer-executable instructions that, when executed by at least one processor of a computing device, cause the computing device to:
load an application launcher into a sandbox;
monitor one or more functions of an application launched from the sandbox from the application launcher;
query a malware detection manager using information obtained from monitoring the one or more functions of the application to determine whether the application is potentially harmful;
modify, based on determining that the application is potentially harmful, an icon for the application to notify a user that the application is potentially harmful;
monitor one or more functions of a different application launched from the sandbox from the application launcher;
determine, using information obtained from monitoring the one or more functions of the different application, that an attribute of the different application has exceeded a threshold;
modify, based on determining that the attribute of the different application has exceeded the threshold, an icon for the different application to notify the user that the different application has exceeded the threshold; and
in response to determining that the attribute of the different application no longer exceeds the threshold, restore the icon of the different application to an original state.

17. The non-transitory computer-readable medium of claim 16, wherein the computer-executable instructions further cause the computing device to perform a security action to protect a computing device from the application that is potentially harmful, and further, wherein the security action comprises at least one of:
preventing the application launcher from launching the application from the sandbox upon receiving an indication from the user to launch the application; or
displaying a notification to the user comprising instructions of how to remove the application.

18. The non-transitory computer-readable medium of claim 16, wherein the computer-executable instructions further cause the computing device to monitor the one or more functions of the application or of the different application from the application launcher by monitoring a function call by the application launcher to at least one of an activity manager, a package manager, or a resource manager associated with the application or with the different application.

19. The non-transitory computer-readable medium of claim 16, wherein the computer-executable instructions further cause the computing device to modify the icon for the application or for the different application by at least one of:

switching the icon with a different icon;
adding a color overlay to the icon;
adding a badge to the icon; and
changing text of the icon.

20. The non-transitory computer-readable medium of claim 16, wherein the computer-executable instructions further cause the computing device to
- generate a user profile comprising the modified icon; and
- transmit the user profile to a server to distribute to a different computing device associated with the user profile.

\* \* \* \* \*